F. E. CASE.
CONTROLLER HANDLE.
APPLICATION FILED MAR. 30, 1910.
970,684.
Patented Sept. 20, 1910.
2 SHEETS—SHEET 1.
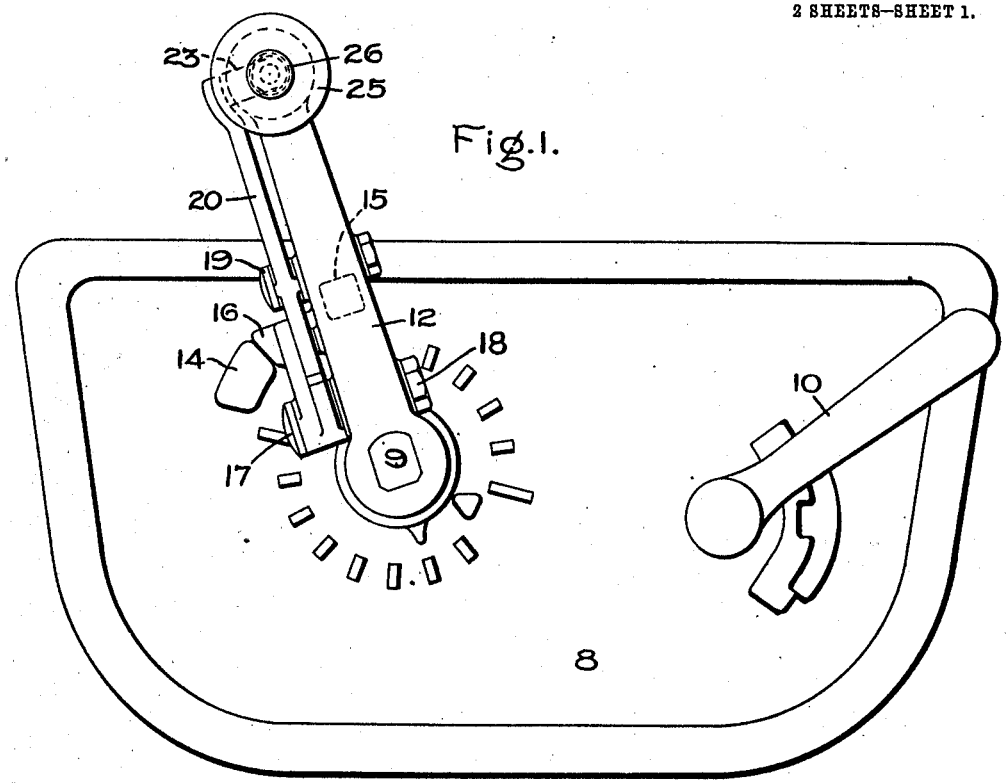
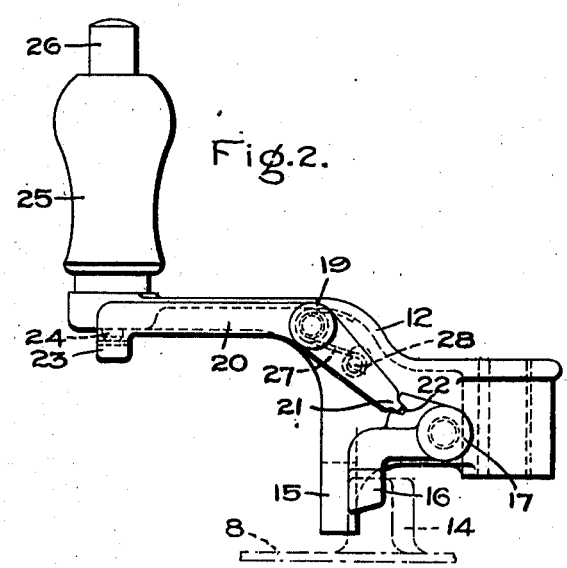
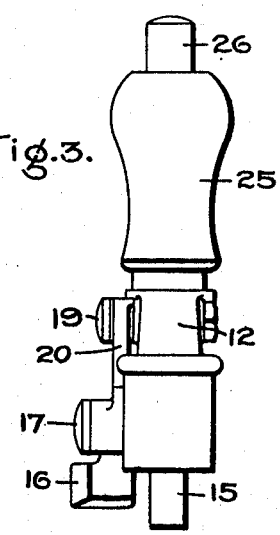
Witnesses:
Earl G. Klock.
J. Ellis Elen.
Inventor:
Frank E. Case,
by Albert H. Davis
His Attorney.

F. E. CASE.
CONTROLLER HANDLE.
APPLICATION FILED MAR. 30, 1910.
970,684.
Patented Sept. 20, 1910.
2 SHEETS—SHEET 2.
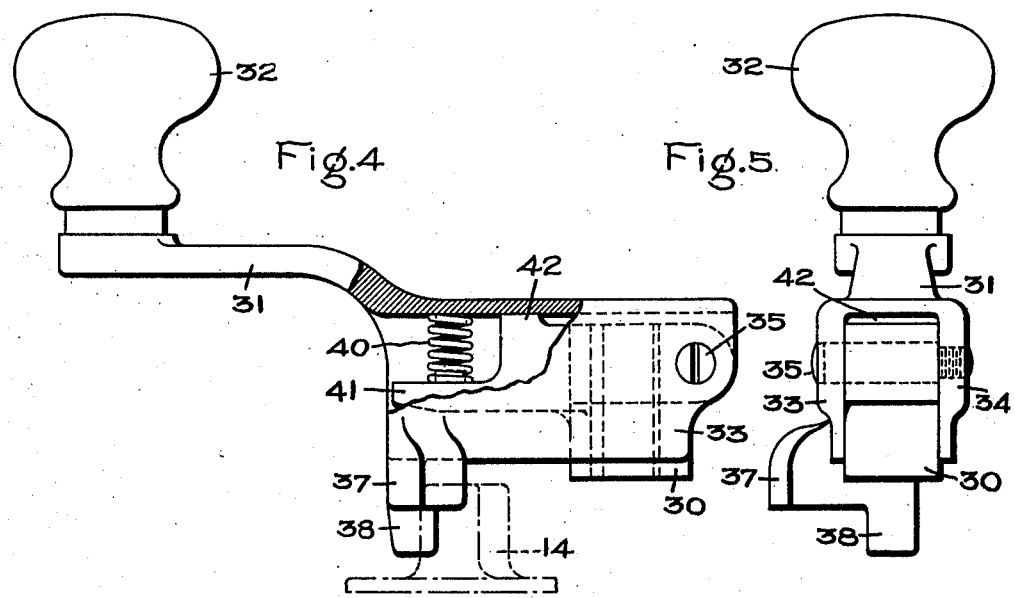
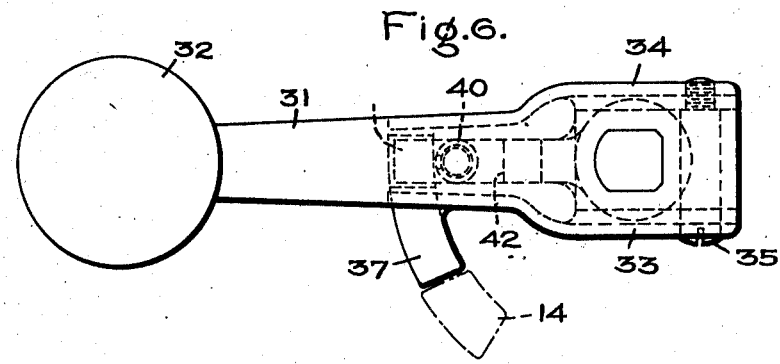
Witnesses:
Earl G. Klock.
J. Ellis Elen.
Inventor:
Frank E. Case,
by Albert G. Davis
His Attorney.

UNITED STATES PATENT OFFICE.

FRANK E. CASE, OF SCHENECTADY, NEW YORK, ASSIGNOR TO GENERAL ELECTRIC COMPANY, A CORPORATION OF NEW YORK.

CONTROLLER-HANDLE.

970,684.  Specification of Letters Patent. Patented Sept. 20, 1910.

Application filed March 30, 1910. Serial No. 552,410.

*To all whom it may concern:*

Be it known that I, FRANK E. CASE, a citizen of the United States, residing at Schenectady, county of Schenectady, State of New York, have invented certain new and useful Improvements in Controller-Handles, of which the following is a specification.

My invention relates to controller handles and particularly to those employed in connection with certain types of controllers for electrically driven cars.

It was originally the custom, in electrically driven cars of moderate size, to make and break the power circuit to the driving motors, to control the relative arrangement of said motors and to regulate the amount of resistance in the motor circuit at the controllers located in duplicate at each end of the car and manipulated by the motorman.
The making and breaking of the motor circuit, however, usually involves considerable arcing, and it has recently become the custom in many cases to provide electro-magnetically operated switches or contactors located beneath the car, or in any other convenient place, for making and breaking the motor circuit. These contactors are controlled from the controller manipulated by the motorman by means of contact fingers and coöperating segments on said controller which govern the control circuit to the actuating coils of said contactors.

In connection with control equipments of the kind just mentioned, it has been found that if the operator throws his controller off too rapidly, or if the contactors are for any reason slow in opening, the motor circuit may be interrupted at the controller before it is opened at the contactors and injurious arcing in the controller may result. In controllers of this type, in the first " on " position those connections are completed which arrange the motors in the desired relation to one another and connect in the circuit the maximum amount of starting resistance; and in the second " on " position of the controller the actuating circuit of the contactors is completed, whereupon said contactors close and the motor circuit is actually connected to the source. It is obvious that if the operator could be relied upon to always pause in throwing off his controller at the first " on " position the contactors would always open and interrupt the motor circuit
before the latter is interrupted in the controller. Experience has shown, however, that operators cannot be relied upon to manipulate the controller in this manner, and it is an object of my invention to provide a handle with means for stopping it in throwing off at the first " on " position during normal operation of the controller, said means being capable of being rendered inoperative at the will of the operator.

To the above end, my invention comprises certain arrangements, of which two illustrative embodiments are hereinafter described.

Referring to the drawings, Figure 1 is a plan view of the top of a controller having a handle embodying my invention applied thereto; Fig. 2 is a side view of the handle shown in Fig. 1; Fig. 3 is an end view of the handle shown in Fig. 1; Fig. 4 is a side view, partly broken away, of another embodiment of my invention; Fig. 5 is an end view of the handle of Fig. 4; and Fig. 6 is a plan view of the handle of Fig. 4.

In Fig. 1, the controller cap-plate is indicated at 8 as of a well-known form. The rotatable member or shaft of the main controller drum is shown at 9 provided with the handle hereinafter described. The handle of the reversing switch is shown at 10.

The controller handle of Figs. 1, 2 and 3 has a body portion 12 of the form clearly shown in the drawings. The hub of this handle is provided with a hole which conforms to the form of the controller shaft 9, and said handle may be either fixed to or removable from said shaft. The cap plate 8 is provided with a stop 14, of the usual form, which serves to limit the movement of the controller handle in the " off " direction and sometimes also in the " on " direction of its movement. In the complete " off " position of the controller the stop 14 is engaged by a lug 15 which may be integral with the body 12 of the controller handle, as shown in the drawings. In the first " on " position of the controller, however, the stop 14 may be engaged by a lug 16, of the form shown, pivoted on a horizontal axis on the body of the handle. The pivot of the lug 16 may consist of a bolt 17 which passes freely through said lug and through the body of the handle and is provided with a nut 18. Pivotally mounted on the handle, by means of a bolt 19, is a lever 20 of the form shown, one end 21 of which engages with a slot 22 in a portion of the pivoted dog 16. The other end of the lever 20 is offset and projects under the handle, as shown at 23, and supports a pin 24 which passes up through the body of the handle and through the grip 25 and carries at its upper end the push-button 26. The lever 20 is biased to the position shown by a spring 27 which may be wound around the shank of the bolt 19 and arranged to engage the underside of the handle body 12 and a pin 28 projecting from the inside of the lever 20, all as clearly shown in the drawing. The end of the dog 16, which coöperates with the fixed stop 14, is so proportioned that, when in the position shown, it will limit the movement of the controller handle in the "off" direction so as to stop the controller drum after the control circuit for the contactors has been interrupted, but before the opening of the other motor circuit connections have been effected by the controller.

In the operation of a controller provided with the handle described above, the operator will normally allow the dog 16 to remain in the position in which it coöperates with the fixed stop 14 and throwing of the controller to the extreme "off" position will be prevented. If, however, for any reason it is necessary to throw the handle to the extreme "off" position, the operator depresses the button 26, thereby manipulating the lever 20 and lifting the dog 16 out of coöperative relation with the stop 14. This permits the controller handle to be thrown to the extreme "off" position in which the lug 15 coöperates with the stop 14. It may be stated that, of course, the reversing drum and the main drum may be mechanically interlocked in the usual manner, in which case the reversing drum cannot be moved except when the controller handle is in the complete "off" position; wherein the lug 15 engages with the stop 14.

Referring now to Figs. 4 and 5, in which another form of handle intended for the same purpose is shown, the stop on the cap-plate is indicated in dotted lines at 14. In this handle, the controller shaft is engaged by a member 30 upon which the rest of the handle is pivoted for movement in a vertical plane. The main body portion of the handle is of the form shown in the drawings and comprises a shank 31 carrying a grip 32, said shank having dependent from its rear end the ears 33 and 34, between which the member 30 is located. A screw 35 extends through the ears 33 and 34 and freely through the member 30 and serves as a pivotal connection between the body portion of the handle and the member 30. The bottom of the body portion of the handle is provided with a projecting portion which consists of two lugs 37 and 38 of the form shown in the drawing. These lugs are adapted to coöperate with the fixed stop 14 on the cap-plate of the controller. The body portion 30 of the handle is biased in an upward direction around the pivot 35 by a spring 40 interposed between the underside of the body portion of the handle and a portion 41 extending upwardly from the member 30, as clearly shown. The movement of the body portion of the handle in an upward direction may be limited in any suitable manner as by the engagement of a portion of the bottom part of the shank 31 of the handle with the projection 41 and said shank may be limited in its downward movement by its engagement with the projecting portion 42 of the member 30. When the handle is in its lower position the lug 37 coöperates with the stop 14 and when the handle is in its upward position the lug 37 is out of coöperative relation with the stop 14 and the lug 38 coöperates with said stop and limits the movement of the handle.

The mode of operation of the handle shown in Figs. 4, 5 and 6 is obvious. During normal operation, the weight of the operator's hand on the grip 32 of the handle is sufficient to hold said handle in its lower position in which the lug 37 is effective to stop the controller at its first position during the throwing off operation. If at any time the operator desires to throw the controller to the extreme "off" position, it is merely necessary for him to release the downward pressure of his hand on the handle sufficiently to allow the spring 40 to raise the handle so that the lug 37 will ride over the stop 14 and the movement of the controller will be limited instead by the lug 38.

I do not wish to be considered as limited to the particular arrangements herein shown and described, since I aim in the appended claims to cover all modifications which are within the scope of my invention.

What I claim as new and desire to secure by Letters Patent of the United States is:—

1. In combination, a controller having a rotatable member, a handle carried by said member, a fixed stop, a lug carried by said handle and movable into and out of coöperative relation with said stop, and another lug carried by said handle and fixed with reference thereto arranged to coöperate with said stop when the first mentioned lug is not coöperating with it.

2. In combination, a controller having a rotatable member, a handle carried by said member, a fixed stop, a lug carried by said handle and movable into and out of coöperative relation with said stop for limiting the movement of said handle, and another lug carried by said handle and fixed with reference thereto arranged to coöperate with said stop when said first mentioned lug is out of coöperative relation with said stop, the second mentioned lug being arranged to allow further movement of the handle than does said first named lug.

3. In combination, a controller having a rotatable member, a handle carried by said member, a fixed stop, a lug carried by said handle and movable thereon into and out of coöperative relation with said stop, means on said handle for moving said movable lug, and another lug carried by said handle and fixed with reference thereto arranged to coöperate with said stop when the movable lug is out of coöperative relation with said stop.

4. In combination, a controller having a rotatable member, a handle carried by said member, a fixed stop, a movable lug carried by said handle and movable into and out of coöperative relation with said stop, a push-button on said handle, a connection between said push-button and said movable lug whereby the latter may be operated from the former, and another lug carried by said handle and fixed with reference thereto arranged to coöperate with said stop when said movable lug is out of coöperative relation with said stop.

5. In combination, a controller having a rotatable member, a handle carried thereby, a fixed stop, a lug pivotally mounted on said handle and movable into and out of coöperative relation with said stop, means carried by said handle for controlling said pivoted lug, and another lug carried by said handle and fixed with reference thereto arranged to coöperate with said stop when said pivoted lug is out of coöperative relation with said stop.

6. In combination, a controller having a rotatable member, a handle carried thereby, a fixed stop, a movable lug carried by said handle arranged to coöperate with said stop, said lug being biased to the position in which it coöperates with said stop, means carried by said handle for moving said movable lug out of coöperative relation with said stop, and another lug carried by said handle and fixed with reference thereto arranged to coöperate with said stop when said movable lug is out of coöperative relation with said stop.

7. In combination, a controller having a rotatable member, a handle carried thereby, a fixed stop, a pivoted lug carried by said handle, a spring for biasing said lug into coöperative relation with said stop, a push-button carried by said handle and operatively connected with said pivoted lug for moving the latter out of coöperative relation with said stop, and another lug carried by said handle and fixed with reference thereto arranged to coöperate with said stop when said pivoted lug is out of coöperative relation with said stop.

In witness whereof, I have hereunto set my hand this 28th day of March, 1910.

FRANK E. CASE.

Witnesses:
   BENJAMIN B. HULL,
   HELEN ORFORD.